(12) United States Patent
Buchfink et al.

(10) Patent No.: US 6,386,611 B1
(45) Date of Patent: May 14, 2002

(54) ARRANGEMENT OF A PLATE-LIKE CARRIER ELEMENT IN THE BODY OF A MOTOR VEHICLE

(75) Inventors: Achim Buchfink, Sindelfingen; Hartmut Heinrich, Nagold; Saber Kammawie, Esslingen; Christoph Mueller, Sindelfingen; Josef Sailer, Haigerloch; Juergen Weingarth, Sindelfingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/705,697

(22) Filed: Nov. 6, 2000

(30) Foreign Application Priority Data

Nov. 6, 1999 (DE) ......................................... 199 53 496

(51) Int. Cl.7 .............................................. B60R 11/00
(52) U.S. Cl. .................. 296/37.1; 296/37.8; 296/37.16; 296/37.14; 296/189
(58) Field of Search ................................ 296/37.1, 204, 296/37.8, 37.15, 37.14, 37.2, 188, 189, 195, 203.04

(56) References Cited

U.S. PATENT DOCUMENTS

| | | | | |
|---|---|---|---|---|
| 4,423,900 A | * | 1/1984 | Sugimoto et al. | 296/37.14 |
| 5,636,890 A | * | 6/1997 | Cooper | 296/37.1 |
| 5,957,526 A | * | 9/1999 | Gramer | 296/204 |
| 6,076,877 A | | 6/2000 | Krieg et al. | 296/37.1 |
| 6,247,741 B1 | * | 6/2001 | Seel et al. | 296/37.14 |

FOREIGN PATENT DOCUMENTS

| | | |
|---|---|---|
| DE | 4127597 | 9/1992 |
| EP | 0 825 067 | 2/1998 |

OTHER PUBLICATIONS

German Office Action dated Mar. 14, 2001.

* cited by examiner

*Primary Examiner*—Joseph D. Pape
(74) *Attorney, Agent, or Firm*—Crowell & Moring LLP

(57) ABSTRACT

A plate-like carrier element which is intended for accommodating devices, for example, for picking up and processing signals is arranged in a vehicle body such that, in the event of crash-induced deformation of the same in the longitudinal direction of the vehicle, damage to the installed devices is avoided. This is achieved in that the carrier element can be fastened on the vehicle-body floor and the connection between the two is such that crash-induced floor deformation, which takes place in the longitudinal direction of the vehicle, results, on the crash side, in an upwardly directed tilting movement of the carrier element, which bears the devices on its top side.

14 Claims, 2 Drawing Sheets

ARRANGEMENT OF A PLATE-LIKE CARRIER ELEMENT IN THE BODY OF A MOTOR VEHICLE

BACKGROUND AND SUMMARY OF THE DISCLOSURE

This application claims the priority of German Patent Application No. 199 53 496.9, filed Nov. 6, 1999 in Germany, the disclosure of which is expressly incorporated by reference herein.

The invention relates to an arrangement of a plate-like, dimensionally stable carrier element which is intended for accommodating devices or device components, for example, for picking up and processing signals and which can be secured essentially horizontally on the floor of a motor-vehicle body. It is known for plate-like carrier elements fitted with electronically or electrically operating control units to be arranged on the floor within the body of passenger vehicles (EP 0 825 067 A2).

Such a positioning of the carrier element means that the units provided on the same are relatively well safeguarded against being destroyed in the event of a crash, provided that the carrier element on the vehicle-body floor is positioned in regions outside crush zones, for example beneath a rear seat bench.

However, structural constraints mean that it is frequently necessary to dispense with such an arrangement, e.g. when the fuel tank is to be accommodated beneath the rear seat bench. In this case, it may be unavoidable for the carrier element, depending on the arrangement of the engine, to be positioned in the front or rear vehicle-body region, which regions are subjected to pronounced deformation in some circumstances in the event of a collision.

An object of the invention is thus to specify, for such a carrier element in a front or rear impact zone of a motor-vehicle body, in particular for passenger vehicles, an arrangement which, even in the event of pronounced deformation of that vehicle-body region which comprises the floor section accommodating the carrier element, ensures that the devices provided on the carrier element remain functional.

This object is achieved according to the invention by providing an arrangement of a plate-like, dimensionally stable carrier element which is intended for accommodating devices or device components, for example, for picking up and processing signals and which can be secured essentially horizontally on a floor of a motor-vehicle body, wherein the connection between the carrier element and floor is such that crash-induced floor deformation, which takes place in a longitudinal direction of the vehicle, results, on the crash side, in an upwardly directed tilting movement of the carrier element, which bears the devices or device components on its top side.

In the event of relatively minor head-on or rear-end crashes and the resulting stressing between the connection of the carrier element and the vehicle-body floor section which bears the same, the inherent rigidity of the plate-like carrier element is sufficient in order to maintain the relative positioning of the individual devices or device components on the carrier element, and the connection between the same, and thus to ensure the functioning thereof.

In the event of a serious crash, the connection between the carrier element and floor section will rupture and, by way of the resulting deformation and/or displacement of the floor section relative to the carrier element, the latter is tilted upwards on the side on which the deformation forces act, inter alia, on the floor section.

By virtue of this upwardly directed yielding movement of the carrier element, the latter assumes more or less the function of a shield which protects the devices provided on said element, with the result that they are ensured of remaining intact.

The arrangement of the carrier element according to the invention also makes it possible for highly sensitive functional units, e.g. emergency-call devices, accident data recorders or a voice-operated control means to be installed outside the passenger compartment, for example in impact or crush zones of passenger vehicles, with the result that, even in the event of serious collisions, the reliable transmission of signals, such as emergency calls, etc. is ensured.

There are different technical solutions available for tilting up the carrier element relative to the vehicle-body floor section which bears the same, said tilting-up action being provided according to the invention in the event of a crash.

This tilting-up action can advantageously be brought about, according to certain preferred embodiments of the invention wherein the carrier element is mounted on the vehicle-body floor such that it can be pivoted about an axis extending in the transverse direction of the vehicle, and it can be locked in its installed position counter to the action of an energy store which is caused to be activated by the crash, with the carrier element being unlocked at the same time.

A design distinguished by particular technical simplicity according to certain preferred embodiments of the invention utilizes an arrangement wherein the carrier element and/or the floor section which bears the same is assigned at least one deflecting surface which slopes up obliquely counter to the crash direction, and wherein the carrier element is assigned a floor-side abutment opposite the deflecting surface. This solution completely does away with auxiliary means which are to be installed specifically and deflect the carrier element upwards in the event of deformation of the floor section.

An advantageous design according to certain preferred embodiments of the invention is given for the case of a carrier-element arrangement provided in the rear of a vehicle body, it being possible for the vehicle-body-mounted part which is necessary as an abutment for the carrier element to be formed, in particular, by a vehicle-body crossmember. Alternatively to this, however, it would also be conceivable for the abutment to be formed by a rear fuel-tank wall part which is also preferably reinforced on the outside.

The carrier element is to be fastened on the floor in certain preferred embodiments of the invention such that, when a certain degree of deformation of the floor section has been reached, the fastening of the carrier element is released in order for the latter to be tilted up. This can be brought about in a favorable manner by a force-fitting connection wherein the carrier element can be plugged onto stay bolts, which project up from the floor section and pass through said carrier element, and can be fastened by threaded nuts which are to be screwed onto said stay bolts and consist of brittle material, in particular plastic.

Other objects, advantages and novel features of the present invention will become apparent from the following detailed description of the invention when considered in conjunction with the accompanying drawings.

DETAILED DESCRIPTION OF THE DISCLOSURE

Figure 1:
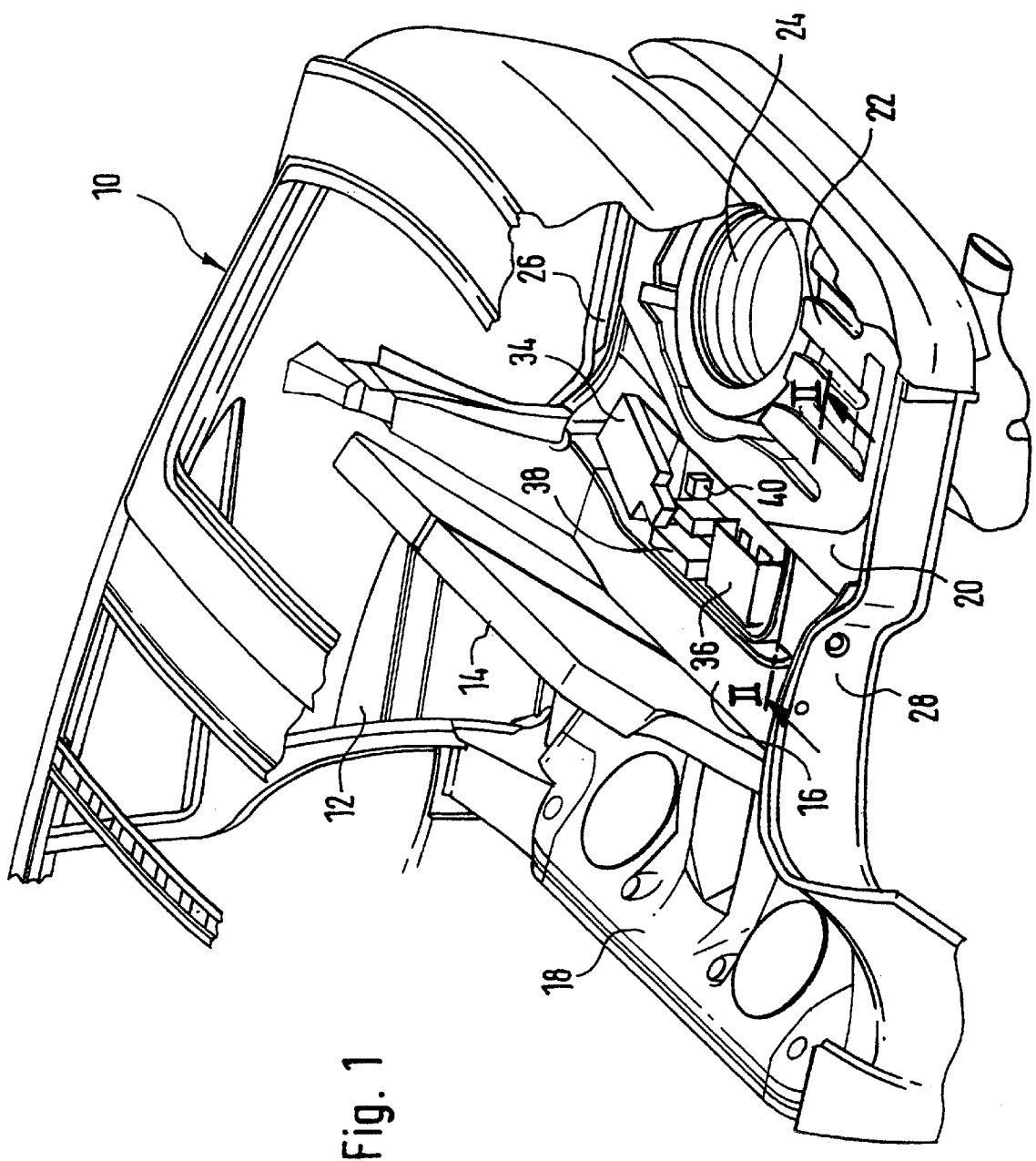
FIG. 1 shows a schematic, cut-away illustration of the rear body part of a passenger vehicle which is provided in the rear with a fitted-out carrier element arranged according to the invention.

In FIG. 1, 10 designates the rear part of the bodyshell of a passenger vehicle, the rear part being separated from the rear passenger-compartment part 12 of said vehicle by a preferably split support 14 of a backrest and a bottom vehicle-body crossmember 16.

In the rear passenger-compartment part 12, or beneath a rear seat which is to be provided, a fuel tank 18 is installed at floor level.

Figure 2:
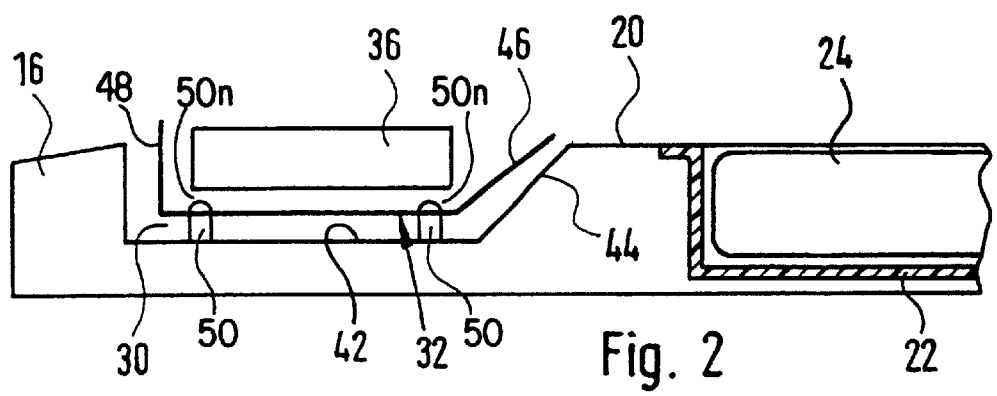
FIG. 2 shows in a highly schematic illustration, on an enlarged scale, a partial longitudinal section along line II—II from FIG. 1.

A well 22, consisting of plastic, for a spare wheel 24 is preferably made in the rear floor section 20. Between the crossmember 16 and well 22, the floor section 20 preferably has a hollow-like depression 30 (FIG. 2) which extends, in the transverse direction of the vehicle, between longitudinal frame members 26 and 28 and is fitted out for a carrier element in the form of a dimensionally stable carrier plate 32, preferably consisting of aluminum, to be arranged or accommodated thereon.

Components of one or more functional units are firmly installed on the top side of said carrier plate 32. Examples of said functional units here are a transmitter 34 for a telephone unit, an emergency-call unit 36 which transmits emergency calls automatically in the event of a crash, an emergency battery 38 which serves for supplying power to the units 34 and 36, and a yaw-angle sensor 40.

Of course, it is also contemplated by the inventor to provide further, or different, units, for example an accident data recorder, a voice-operated control means, an emergency-call aerial amplifier, etc.

The carrier plate 32 is fastened on the floor 42 of the depression 30 of the floor section 20 by means of stay bolts 50 which project up from the floor 42, pass through the carrier plate 32 and are fitted with threaded nuts 50n which are screwed onto the stay bolts and are supported on the top carrier-plate side. In the event of a crash, the carrier plate is pivoted about an axis 52 extending in the transverse direction. The threaded nuts preferably consist of brittle plastic or other, suitable material and ensure that these will rupture at least in part in the event of crash-induced compressive and/or shear forces acting thereon, with the result that the connection between the floor 42 and the carrier plate 32 is eliminated there.

For this purpose, it is necessary, in the event of a crash, for corresponding forces to be able to act on the carrier plate 32 such that the latter is raised up from the floor 42 in a specific manner at least in certain regions.

According to the invention, for this purpose, the design is such that, with deformation forces acting in the direction of travel, i.e. from the rear, the carrier plate 32 is tilted upwards by way of its longitudinal plate side which is directed towards the rear of the vehicle, and this yielding movement ensures that the devices or device components 34, 36, 38, 40 installed on it are not damaged and cable connections cannot rupture or be released.

In its tilted position, the carrier plate 32 then assumes, to a certain extent, the function of a protective shield, with the result that, for example in the event of a serious crash, an emergency call will nevertheless be reliably transmitted.

Figure 3:
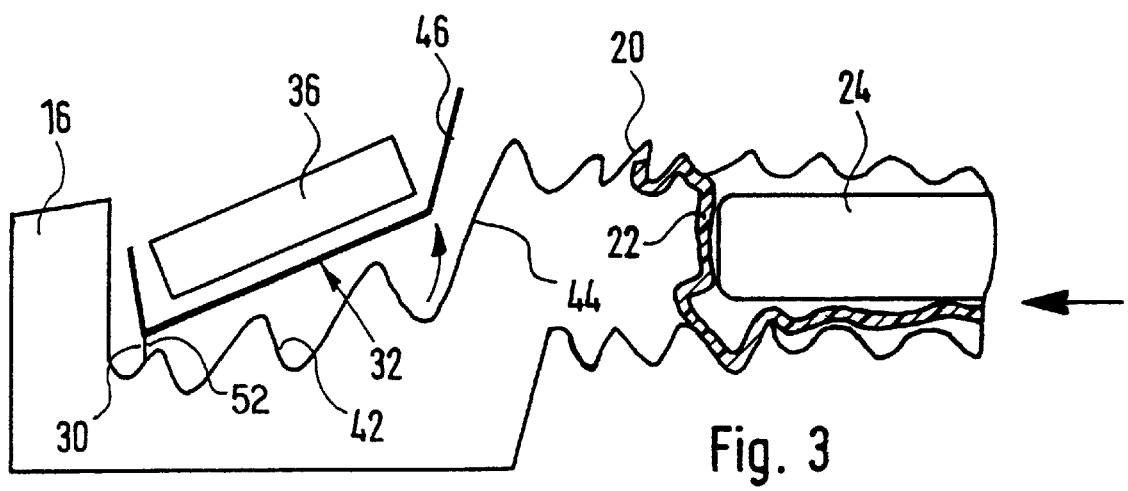
FIG. 3 shows an illustration similar to FIG. 2 following crash-induced deformation of the vehicle-body floor section which accommodates the carrier element.

In order for the crash kinematics shown in FIG. 3 to be established in the case of correspondingly pronounced deformation of the floor in the rear part, the carrier plate 32 is assigned a deflecting slope which is located between the carrier plate 32 and floor section 20. In the exemplary embodiment shown, said deflecting slope is formed, for example, by two mutually parallel wall parts, of which one is formed by the longitudinal wall 44 of the hollow-like depression 30, said longitudinal wall being directed towards the well 22 and being directed obliquely upwards and rearwards from the bottom, and the other is formed by a longitudinal border section 46 of the carrier plate 32, said border section being adjacent to said longitudinal wall.

At the opposite longitudinal border section 48 of the carrier plate 32, the latter is assigned a vehicle-body-mounted stop which, in the present case, is preferably formed by a vehicle-body crossmember 16.

A serious crash causes, in particular, the floor section 20 of the rear vehicle-body part to be pushed together to a pronounced extent, by buckling, in the longitudinal direction of the vehicle body, the screw-connection of the carrier plate 32 being released such that, as a result of the wedge action caused by the slope of the two longitudinal border sections 44 and 46, the latter can be displaced relative to one another.

By virtue of this displacement, the carrier plate 32 is forced to tilt obliquely upwards in the rearward direction in order to protect the parts provided on it, in which case, inter alia, its raised-up wall part 46 will also form an effective impact protection means.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement of a plate-like, dimensionally stable carrier element which is intended for accommodating devices or device components on its top side, and which can be secured essentially horizontally on a floor of a motor-vehicle body, wherein a connection between the carrier element and floor is such that crash-induced floor deformation, which takes place in a longitudinal direction of the vehicle, results, on a crash side, in an upwardly directed tilting movement of the carrier element, which bears the devices or device components on its top side.

2. Arrangement according to claim 1, wherein the carrier element is mounted on the vehicle-body floor such that it can be pivoted about an axis extending in the transverse direction of the vehicle, wherein said carrier element can be locked in its installed position about said axis counter to the action of an energy store which is caused to be activated by the crash, with the carrier element being unlocked at the same time.

3. Arrangement according to claim 1, wherein the carrier element and a floor section which bears the same has at least one deflecting surface which slopes up obliquely counter to a crash direction, and wherein the carrier element has a vehicle-body-mounted stop opposite the deflecting surface.

4. Arrangement according to claim 3, wherein the carrier element is provided in the rear region of a passenger-vehicle body, between a vehicle-body crossmember and a rear floor part and the oblique deflecting surface or deflecting surfaces is provided between the carrier element and rear floor part.

5. Arrangement according to claim 3, wherein the carrier element can be plugged onto stay bolts, which project up from the floor section and pass through said carrier element, and can be fastened by threaded nuts which are to be screwed onto said stay bolts and consist of brittle material.

6. Arrangement according to claim 4, wherein the carrier element can be plugged onto stay bolts, which project up from the floor section and pass through said carrier element, and can be fastened by threaded nuts which are to be screwed onto said stay bolts and consist of brittle material.

7. A passenger vehicle assembly comprising:
a pair of longitudinal spaced body support members,
a crossmember connecting the longitudinal members,
said longitudinal and crossmembers delimiting a vehicle floor space behind a vehicle passenger seat, said floor space being bounded below by a vehicle floor, and
a dimensionally stable carrier element operable in use to accommodate emergency signal generating components, said carrier element being disposed in use in the floor space,
wherein the carrier element is connected to the floor such that crash induced floor deformations result in an upwardly directed tilting of the carrier element.

8. An assembly according to claim 7, wherein the carrier element is mounted on the vehicle-body floor such that it can be pivoted about an axis extending in the transverse direction of the vehicle, wherein said carrier element can be locked in its installed position about said axis counter to the action of an energy store which is caused to be activated by the crash, with the carrier element being unlocked at the same time.

9. An assembly according to claim 7, wherein the carrier element and a floor section which bears the same has at least one deflecting surface which slopes up obliquely counter to a crash direction, and
wherein the carrier element has a vehicle-body-mounted stop opposite the deflecting surface.

10. Arrangement according to claim 1, wherein the plate-like, dimensionally stable carrier element is intended for picking up and processing signals.

11. Arrangement according to claim 1, wherein the carrier element or a floor section which bears the same has at least one deflecting surface which slopes up obliquely counter to a crash direction, and
wherein the carrier element has a vehicle-body-mounted stop opposite the deflecting surface.

12. An assembly according to claim 7, wherein the carrier element or a floor section which bears the same has at least one deflecting surface which slopes up obliquely counter to a crash direction, and
wherein the carrier element has a vehicle-body-mounted stop opposite the deflecting surface.

13. Arrangement according to claim 5, wherein the brittle material is plastic.

14. Arrangement according to claim 6, wherein the brittle material is plastic.

* * * * *